United States Patent [19]

Chan et al.

[11] Patent Number: 4,664,282
[45] Date of Patent: May 12, 1987

[54] VARIABLE SHAPE STRUCTURE

[76] Inventors: David M. F. Chan, 1213 King Dr., El Cerrito, Calif. 94530; Michael L. F. Chan, 1407 Arch St., Berkeley, Calif. 94708

[21] Appl. No.: 823,435

[22] Filed: Jan. 28, 1986

[51] Int. Cl.⁴ ............................................. B65D 6/24
[52] U.S. Cl. ..................................... 220/4 C; 217/36; 217/43 R; 217/43 A; 220/80
[58] Field of Search ............... 220/4 F, 4 C, 80; 217/36, 43 R, 43 A

[56] References Cited

U.S. PATENT DOCUMENTS

| | | | |
|---|---|---|---|
| 721,003 | 2/1903 | Boutwell | 217/43 |
| 879,855 | 2/1908 | Cronbaugh | 217/36 |
| 925,799 | 6/1909 | Boyd | 217/36 |
| 1,022,814 | 4/1912 | Beehler . | |
| 1,200,085 | 10/1916 | Crane | 217/36 |
| 1,903,722 | 4/1933 | Merritt | 217/36 |
| 2,260,423 | 10/1941 | Washbourne | 220/4 F |
| 2,686,645 | 8/1954 | Whitehurst et al. . | |
| 2,885,070 | 5/1959 | Ondreja | 220/4 C |
| 2,919,045 | 12/1959 | Waugh | 220/4 F |
| 3,799,382 | 3/1974 | Munroe | 217/43 A |
| 3,823,508 | 7/1974 | Takehara . | |
| 3,955,681 | 5/1976 | DeZinno . | |
| 4,077,593 | 3/1978 | Carratala . | |

Primary Examiner—George E. Lowrance
Attorney, Agent, or Firm—Robert R. Tipton

[57] ABSTRACT

A structure for holding plants, flowers or other objects utilizes a plurality of generally rectangular bar members having a hole at each end, the generally rectangular bar members being stacked in alternate directions in a rectilinear array, the holes proximate the ends of the bars aligned with like holes in the ends of other of said bars, with a set of assembly rods each engaging the aligned holes to define a rectilinear structure, hinged at each corner. A tray having a rectilinear shape, such as, a rectangle or parallelogram (diamond) is adapted to be inserted between a selected layer of assembled bars and engage opposite pairs of the rectangular bar members to maintaining the sides of the rectilinear stacked array at a predetermined angle to each other in the general shape of the tray.

1 Claim, 10 Drawing Figures

VARIABLE SHAPE STRUCTURE

BACKGROUND OF THE PRIOR ART

This invention relates generally to rectilinear containers and in particular to rectilinear containers which can be varied in shape without disassembling the entire structure.

The variable shaped containers of the prior art generally included mechanical bracket arms or folding sides to achieve a change of shape.

Such structures were generally mechanically complex and expensive to manufacture.

The variable shape structure of the present invention is of much simpler design and less expensive to manufacture.

SUMMARY OF THE INVENTION

The variable shape structure of the present invention is caused to change to a predetermined shape through the use of a slidable tray and comprises, basically, a plurality of generally rectangular bar members, each bar member having a hole proximate each end thereof adapted to receive an assembly rod. The generally rectangular bar members are stacked in a rectilinear, ordered array, the holes in the ends of each bar member being aligned with similar holes in like bar members. A tray having generally rectilinear sides, a peripheral support area surrounding a depressed area and of a predetermined shape, is placed in the array whereby the peripheral support area, depressed area and the edges of the peripheral support area engage a selected level of the stacked bar members to maintain the shape of the structure.

It is, therefore, an object of the present invention to provide a variable shape structure.

It is a further object of the present invention to provide a variable shape structure in which the sides of the structure are hinged to each other.

It is still another object of the present invention to provide a variable shape structure in which a plurality of bar members are stacked in an ordered array defining alternate open spaced between stacked bar members.

It is yet another object of the present invention in which the bar members comprise a "C"-shape cross-section.

It is another object of the present invention to provide a variable shape structure in which a support tray is inserted between bar members at a selected level of said stacked array of bar members to engage said bar members and provide structural rigitity.

These and other objects of the present invention will become manifest upon study of the following detailed description when taken together with the drawings.

DESCRIPTION OF THE PREFERRED EMBODIMENT

Figure 1:
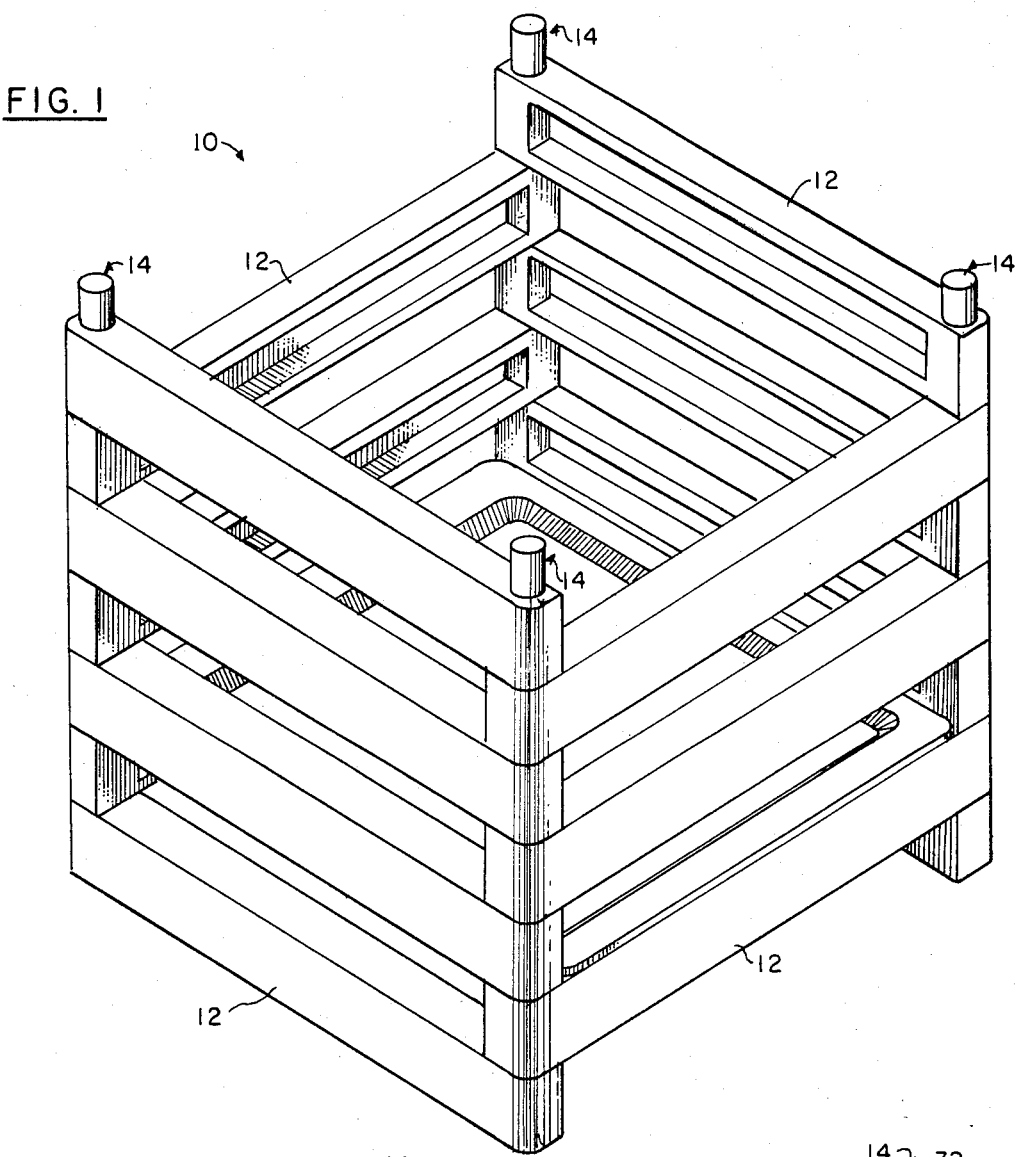
FIG. 1 is an isometric view of the assembled variable shape structure of the present invention.

With reference to FIG. 1, there is illustrated an isometric view of the assembled variable shape structure 10 of the present invention comprising, basically, a plurality of generally rectangular bar members 12 having a hole 78 in each end thereof adapted to receive an assembly rod 14, the rectangular bars being stacked in alternate directions in a rectangular array.

Figure 2:
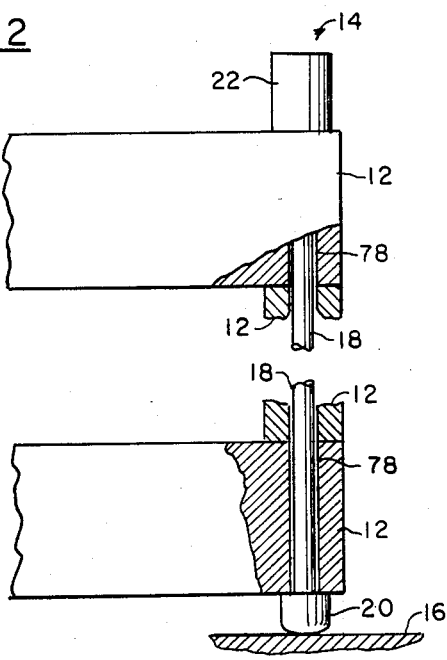
FIG. 2 is an elevational, partial sectional view of a corner of the variable shape structure of FIG. 1 showing one configuration of the corner assembly.
Figure 3:
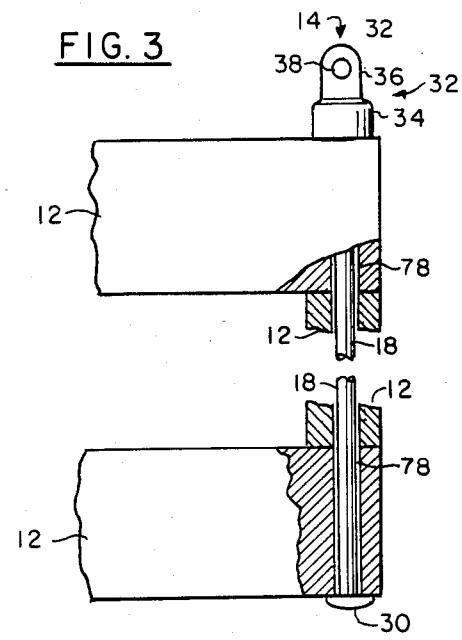
FIG. 3 is an elevational, partial sectional view of a corner or the variable shape structure of FIG. 1 showing a second configuration of the corner assembly.

The detail of the method of connecting bar members 12 together using assembly rod 14 is best seen in FIGS. 2 and 3 which are elevational, partial sectional views of one corner of the variable shape structure 10 of FIG. 1.

FIG. 2 illustrates an assembly rod 14 for a variable shape structure that is designed to rest on a supporting surface 16.

In FIG. 2, assembly rod 14 comprises a tension member 18 connected at its bottom end to foot member 20 and at its top end to finial or decorative cap screw 22.

Finial or decorative cap screw 22 is shown as a cylindrical shape, however, other decorative shapes may be used in keeping with the decorative shape of variable shape structure 10 and bar members 12.

FIG. 3 illustrates an assembly rod for a variable shape structure that is designed to be suspended from a ceiling or other structure using a chain, cable or the like.

In FIG. 3, assembly rod 14 comprises a tension member 18 connected at its bottom end to cap member 30 and at its top end to finial or decorative cap screw 32.

Finial or decorative cap screw 32 comprises a base portion 34 and a top portion 36, top portion 36 having a hole 38 therein adapted to receive a chain or the like (not shown) for hanging variable shape structure 10 from a ceiling or the like.

Figure 4:
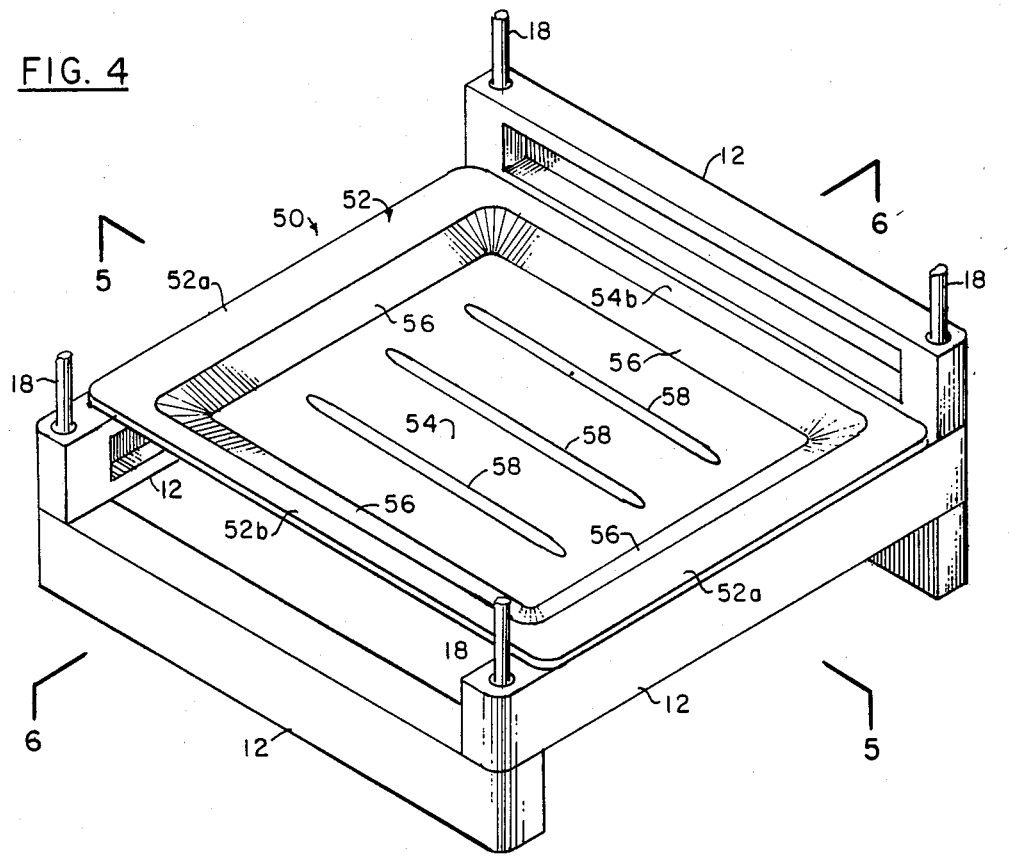
FIG. 4 is an isometric, cut-away view of the assembled variable shape structure of FIG. 1 showing the manner in which the support tray is installed.

With reference to FIG. 4, there is illustrated a isometric cut-away view of the variable shape structure 10 of FIG. 1 showing shaping tray 50 in place within structure 10.

Shaping tray 50 comprises a generally flat peripheral area 52 surrounding by depressed area 54 having sloping sides 56 connecting depressed area 54 to peripheral area 52.

Peripheral area 52 comprises a pair of oppositely disposed wide lips 52a and a pair of oppositely disposed narrow lips 52b.

Figure 5:
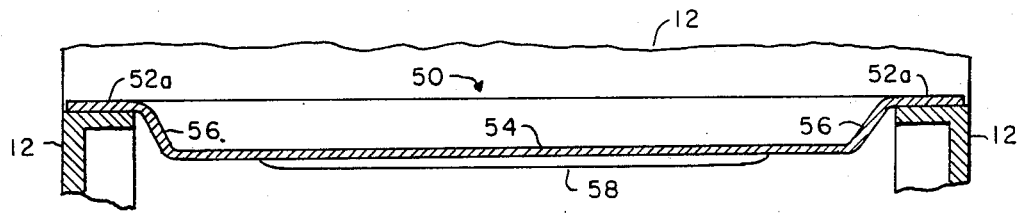
FIG. 5 is an elevational, cross-sectional view of the support tray taken at lines 5-5 in FIG. 4.

As shown in FIG. 5, wide lips 52a are adapted to engage the top surface of bar member 12 as tray 50 spans the distance between oppositely disposed bar members 12.

Figure 6:
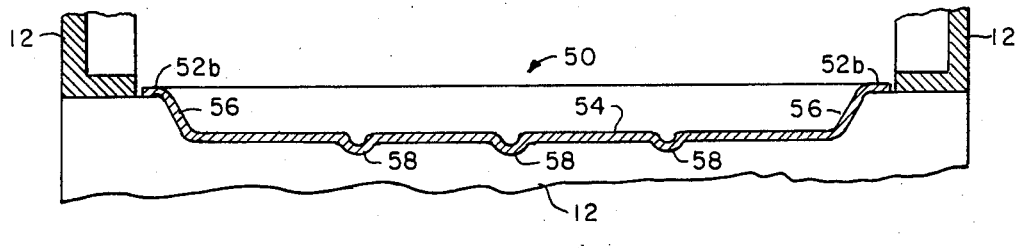
FIG. 6 is an elevational, cross-sectional view of the support tray taken at lines 6-6 in FIG. 4.

As shown in FIG. 6, narrow lips 52b are adapted to engage the inside surface 60 of bar members 12 of the layer above the bar members 12 on which lips 52a rest.

Stiffening ribs 58 are formed in depressed area 54 for the purpose of increasing the rigidity of depressed area 54 to support a potted plant or the like (not shown).

Figure 7:
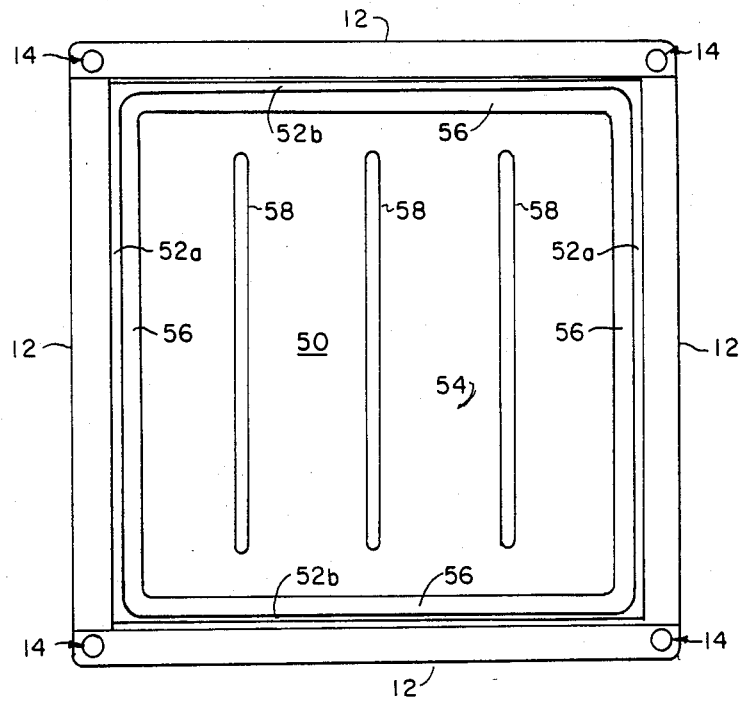
FIG. 7 is a plan view illustrating one shape of the support tray of the variable shape structure of the present invention.

With reference to FIG. 7, there is illustrated a plan view of variable shape structure 10 of the present invention showing rectangular tray 50 in place.

Figure 8:
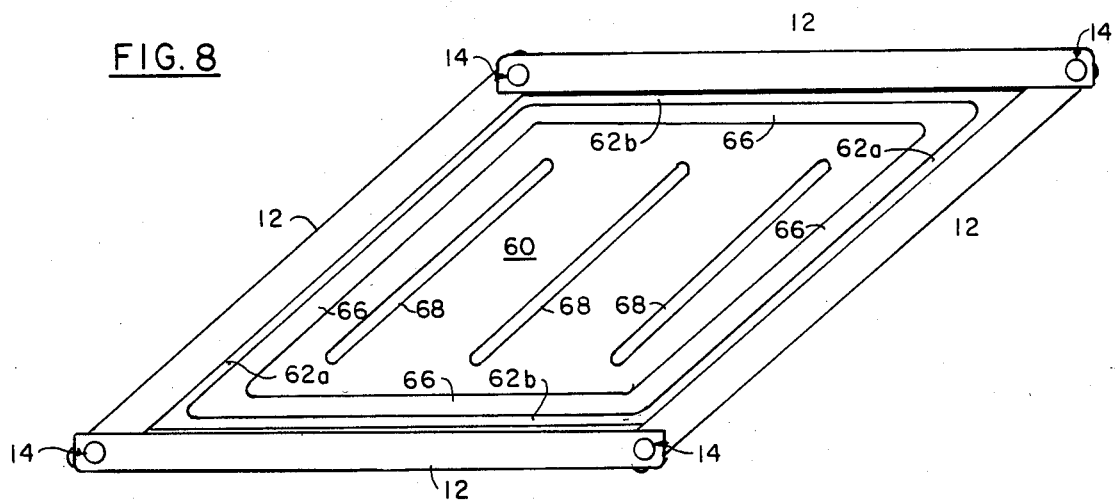
FIG. 8 is a plan view illustrating a second shape of the support tray of the variable shape structure of the present invention.

With reference to FIG. 8, there is illustrated a plan view of variable shape structure 10 of the present invention showing a diamond shape tray 60 in place thus changing the shape of structure 10 to that of a diamond.

Diamond shape tray 60 comprises the same features as rectangular tray 50 including peripheral area 62 surrounding depressed area 64, consisting of wide lips 62a and narrow lips 62b, with sloping sides 66 connecting peripheral area 62 to depressed area 64. Depressed area 64 is also provided with reinforcing ribs 68.

Figure 9:
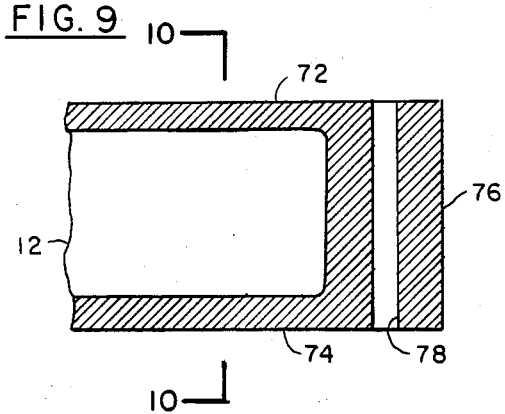
FIG. 9 is an elevational, longitudinal cross-sectional view of a typical bar member of the variable shape structure of the present invention.
Figure 10:
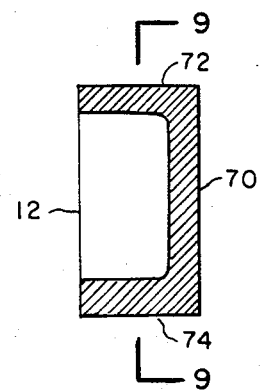
FIG. 10 is an elevational, lateral cross-sectional view of the typical bar member of the variable shape structure of the present invention.

With reference to FIGS. 9 and 10 there is illustrated longitudinal and lateral cross-sections, respectively, of bar member 12.

Bar member 12 can be fabricated out of either metal or plastic and comprises a generally planar vertical side portion 70 and a pair of generally planar, parallel top and bottom portions 72 and 74, respectively connected to the vertical side portion to define a rectilinear "C"-shape cross-section.

A generally planar vertical end portion 76 is disposed perpendicular to top and bottom portions 72 and 74, respectively.

A hole 78 is provided proximate each end of bar member 12 passing vertically through top and bottom of end portion 76.

If bar member 12 were fabricated out of sheet metal, hole 78 would pass though top and bottom portions 72 and 74, respectively, since end portion 76 would be too thin to accommodate hole 78.

To assembly the variable shape structure of the present invention, a pair of bar members 12 are placed on supporting surface 16 spaced apart and parallel to each other.

Another pair of bar members 12 are then placed on top of the first layer of bar members with holes 78 aligned with like holes 78 in the layer below.

Tension members 18, having foot members 20 or 30 attached thereto, are then inserted into holes 78 at each corner of the stacked bar members 12 and the remaining bar members stacked in alternately diposed layers using tension members 18 as a guide.

Upon completion of the assembly of bar members 12, finial or decorative cap screw 22 of 32 is attached to tension members 18 and tightened to create a hinge at each of the corners of variable shape structure 10.

To establish the variable shape structure 10 of the present invention, tray 50 (or tray 60) is inserted in the opening between two tiers or layers of bar members 12. The layer or tier selected will depend upon the height of the object that will be contained in variable shape structure 10. For example, for a shallow potted plant, tray 50 (or tray 60) can be inserted into a layer or tier near the top of variable shape structure 10. For a deep potted plant, tray 50 can be inserted into a layer or tier near the bottom of variable shape structure 10.

Tray 50 (or tray 60) is inserted into variable shape structure 10 with sides or lips 52b (lips 62b for tray 60) clearing the sides of the opening between a pair of bar members 12, until lips 52a (lips 62a of tray 60) are resting or engaging the top of, and spanning, an opposite pair of bar members 12.

As can be seen from FIG. 6, the side edges of lips 52b (lips 62b of tray 60) will engage the inside surface 59 of an opposite pair of bar members 12 to thus maintain the shape of structure 10.

In addition, sloping sides 56 (sloping sides 66 of tray 60) will also engage the inside corner of the opposite pair of bar members 12 on the top of which rests lips 52a (lips 62a of tray 60) of tray 50 (or tray 60) to maintain the shape of structure 10.

Thus is described a variable shape structure.

We claim:

1. A variable shape structure comprising
a plurality of generally rectilinear bar members, each bar member comprising
a generally planar, vertical side portion and a pair of generally planar, parallel top and bottom portions connected to said vertical side portion defining a rectangular "C"-shape cross section,
means defining a hole proximate each end of said rectilinear bar members passing vertically through said generally parallel top and bottom portions, and
a generally planar vertical end portion disposed perpendicularly to said top, bottom and side portions,
said bar members being stacked in alternate directions in a rectilinear array with said holes proximate the each end of said bar member aligned with like holes in an alternately positioned bar member, the lip of said "C"-shaped rectilinear bar member facing inwardly,
said assembly rods passing through and engaging the aligned holes in said rectilinear array of stacked bar members to define a hinged corner, and
a tray comprising
a first pair of generally parallel, rectilinear side portions defining a generally flat peripheral area,
the bottom surface of said first pair of generally rectilinear side portions adapted to rest on and engage the top portion of a first pair of oppositely disposed, parallel, rectilinear "C"-shaped bar members,
a second pair of generally parallel, rectilinear side portions defining a generally flat peripheral area,
the vertical side edges of said second pair of generally parallel rectilinear side portions adapted to engage the vertical edge of said inward facing lip of said "C"-shaped cross-section of a second pair of generally parallel, oppositely disposed bar members having their ends resting on and engaging the top portion of said first bar members upon which said first pair of generally parallel side portions rest and engage, and
a generally planar depressed area disposed within said peripheral area having sloping sides connecting said depressed area to said peripheral area, said sloping sides adapted to engage the inside edge and lip of said "C"-shape cross section, along said top portion of said first bar members.

* * * * *